(12) United States Patent
Grobis et al.

(10) Patent No.: US 8,824,075 B2
(45) Date of Patent: Sep. 2, 2014

(54) TEMPLATED GRANULAR MAGNETIC RECORDING MEDIA

(71) Applicant: HGST Netherlands B.V., Amsterdam (NL)

(72) Inventors: Michael Konrad Grobis, San Jose, CA (US); Manfred E. Schabes, Saratoga, CA (US)

(73) Assignee: HSGT Netherlands B.V., Amsterdam (NL)

( * ) Notice: Subject to any disclaimer, the term of this patent is extended or adjusted under 35 U.S.C. 154(b) by 0 days.

(21) Appl. No.: 13/720,952

(22) Filed: Dec. 19, 2012

(65) Prior Publication Data

US 2014/0168807 A1    Jun. 19, 2014

(51) Int. Cl.
*G11B 27/36*    (2006.01)
*G11B 5/09*    (2006.01)

(52) U.S. Cl.
USPC .............................................. 360/31; 360/51

(58) Field of Classification Search
None
See application file for complete search history.

(56) References Cited

U.S. PATENT DOCUMENTS

| | | | |
|---|---|---|---|
| 6,754,017 B2 | 6/2004 | Rettner et al. | |
| 7,388,728 B1 | 6/2008 | Chen et al. | |
| 7,561,365 B2 | 7/2009 | Noguchi et al. | |
| 7,729,074 B2 | 6/2010 | Venkataramani et al. | |
| 2009/0116352 A1 | 5/2009 | Itakura | |
| 2010/0128583 A1* | 5/2010 | Albrecht et al. | 369/47.14 |
| 2010/0202079 A1 | 8/2010 | Buch et al. | |
| 2011/0141610 A1 | 6/2011 | Grobis et al. | |
| 2011/0205861 A1* | 8/2011 | Erden et al. | 369/13.27 |

OTHER PUBLICATIONS

Leong et al., "Patterned Media and Energy Assisted Recording Study by Drag Tester," Jul. 2011 IEEE, IEEE Transactions on Magnetics, vol. 47, No. 7, pp. 1981-1987.

* cited by examiner

*Primary Examiner* — Regina N Holder
(74) *Attorney, Agent, or Firm* — Zilka-Kotab, PC

(57) ABSTRACT

A system and method for recording data to a perpendicular magnetic recording media having a highly ordered granular structure. The method includes the synchronization of write frequency and write phase to the granular structure of the magnetic media optimize performance of the magnetic data recording system by minimizing bit error rate.

17 Claims, 15 Drawing Sheets

TEMPLATED GRANULAR MAGNETIC RECORDING MEDIA

FIELD OF THE INVENTION

The present invention relates to magnetic data recording and more particularly to a magnetic data recording system having a templated granular magnetic media and circuitry for synchronizing data recording to the templated granular magnetic media.

BACKGROUND OF THE INVENTION

A key component of most computers is an assembly that is referred to as a magnetic disk drive, or hard disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). When the slider rides on the air bearing, the write and read heads are employed for writing magnetic impressions to and reading magnetic impressions from the rotating disk. The read and write heads are connected to processing circuitry that operates according to a computer program to implement the writing and reading functions.

Perpendicular magnetic recording, wherein the recorded bits are stored in a perpendicular or out-of plane orientation in the recording layer, is a promising path toward ultra-high recording densities in magnetic recording hard disk drives. One type of perpendicular magnetic recording system is a system that uses a dual layer media. The dual layer media includes a perpendicular magnetic data recording layer formed on a soft or relatively low coercivity magnetically permeable under-layer. The under-layer serves as a flux return path for the field from the write pole to the return pole of the recording head. The magnetic transitions between adjacent oppositely direct magnetized regions are detectable by the read element or head as the recorded bits.

Other variations of granular media have been explored for use in magnetic data recording systems as well. For example, granular media that can be used with thermally assisted writing, and microwave assisted writing. Media for thermally assisted recording (TAR) may include granular materials like CoPtCr, FePt, CoPt and other alloys. Media for microwave assisted writing may include granular materials like CoPtCr, FePt, CoPt and other alloys.

One type of material that can be used as a recording layer is a granular ferromagnetic cobalt (Co) alloy, such as a CoPtCr alloy, with a hexagonal-close-packed (HCP) crystalline structure having the c-axis oriented substantially out of plane or perpendicular to the plane of the recording layer. The granular cobalt alloy recording layer should also have a well-isolated fine-grain structure to produce a high coercivity (Hc) media and to reduce inter-granular exchange coupling, which is responsible for high intrinsic media noise. Enhancement of the grain segregation in the cobalt alloy recording layer can be achieved by the addition of oxides, including oxides of Si, Ta, Ti and Nb. These oxides tend to precipitate to the grain boundaries, and together with the elements of the cobalt alloy, form a non-magnetic inter-granular material.

The Co alloy recording layer has substantially out of plane or perpendicular magnetic anisotropy as a result of the c-axis of its HCP crystalline structure being induced to grow substantially perpendicular to the plane of the layer during deposition. To induce this growth of the HCP recording layer, the inter-layer onto which the recording layer is formed is also an HCP material. Ruthenium (Ru) and certain Ru alloys, such as RuCr, are non-magnetic HCP materials that can be used for the inter-layer.

The enhancement of segregation of the magnetic grains in the recording layer by the additive oxides is important for achieving high areal density and recording performance. The inter-granular oxide material not only decouples inter-granular exchange, but also exerts control on the size and distribution of the magnetic grains in the recording layer. Current disk fabrication methods achieve this segregated recording layer by growing the recording layer on a Ru or Ru-alloy interlayer that exhibits columnar growth of the Ru or Ru alloy grains. The columnar growth of the interlayer is accomplished by sputter depositing it at a relatively high sputtering pressure.

However, such a process results in a recording layer having a relatively wide variation in the size of the magnetic grains. A large grain size distribution is undesirable because it results in a variation in magnetic recording properties across the disk and because some of the smaller grains can become thermally unstable, resulting in a loss of data. There is, therefore, a need for a magnetic media having uniform grain structure, and also for a recording system that can effectively record to such a recording medium without excessive signal noise or bit error rate.

SUMMARY OF THE INVENTION

The present invention provides a method for magnetic data recording to a magnetic media configured for perpendicular magnetic data recording and having an ordered granular structure. The method includes writing an un-synchronized bootstrap servo to the magnetic media, and creating a frequency map and a phase map. A synchronized servo is then recorded to the media and the frequency map and phase map are refined.

The method can be embodied in a magnetic data recording system that includes circuitry for synchronizing the write frequency and phase to the ordered granular structure of the media.

The invention advantageously allows full advantage to be taken of a well ordered grain structure in a magnetic media, which may be a templated magnetic media having various zones each with an ordered granular structure.

The invention can be implemented in a system wherein the magnetic media has a lattice with one or more lattice vectors and wherein the grain lattice is ordered so that one of the one or more lattice vectors is kept parallel to a constant field contour of a trailing edge of a write pole of the write head and is appropriately rotated to account for skew of the write head.

In addition, the invention can be implemented in a data recording system wherein the system is configured for one or more of thermally assisted magnetic recording, microwave assisted recording and shingled magnetic recording.

In addition, the invention can be implemented in a system having electronics configured to synchronize the write frequency and write phase in a down-track direction, but not in a cross-track direction.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
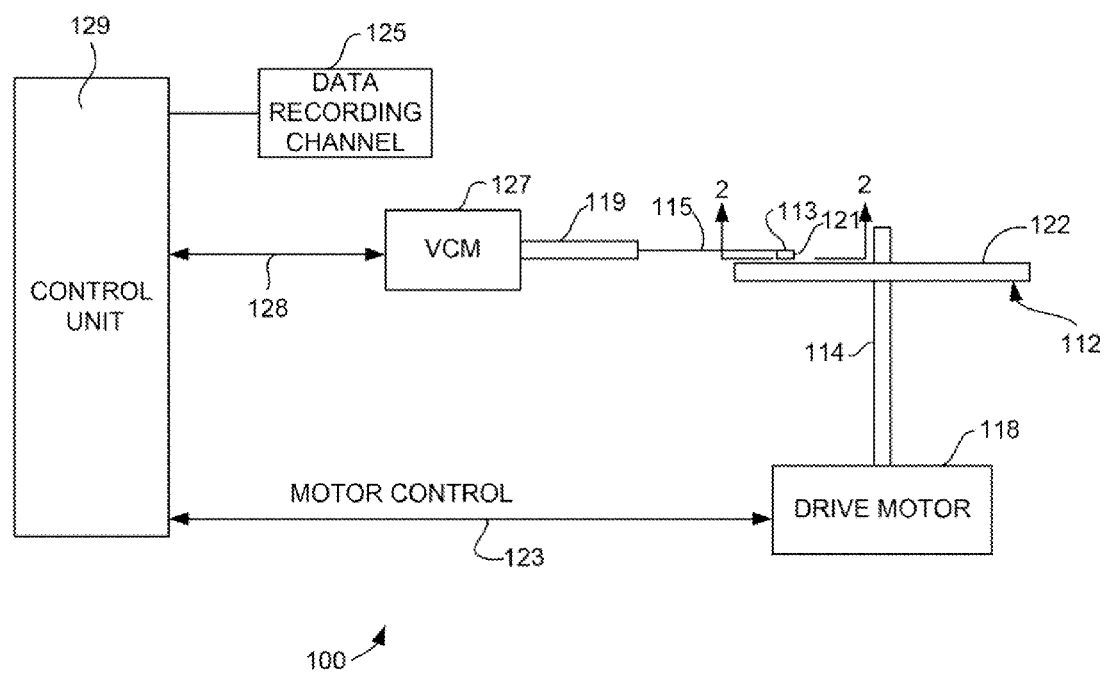
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
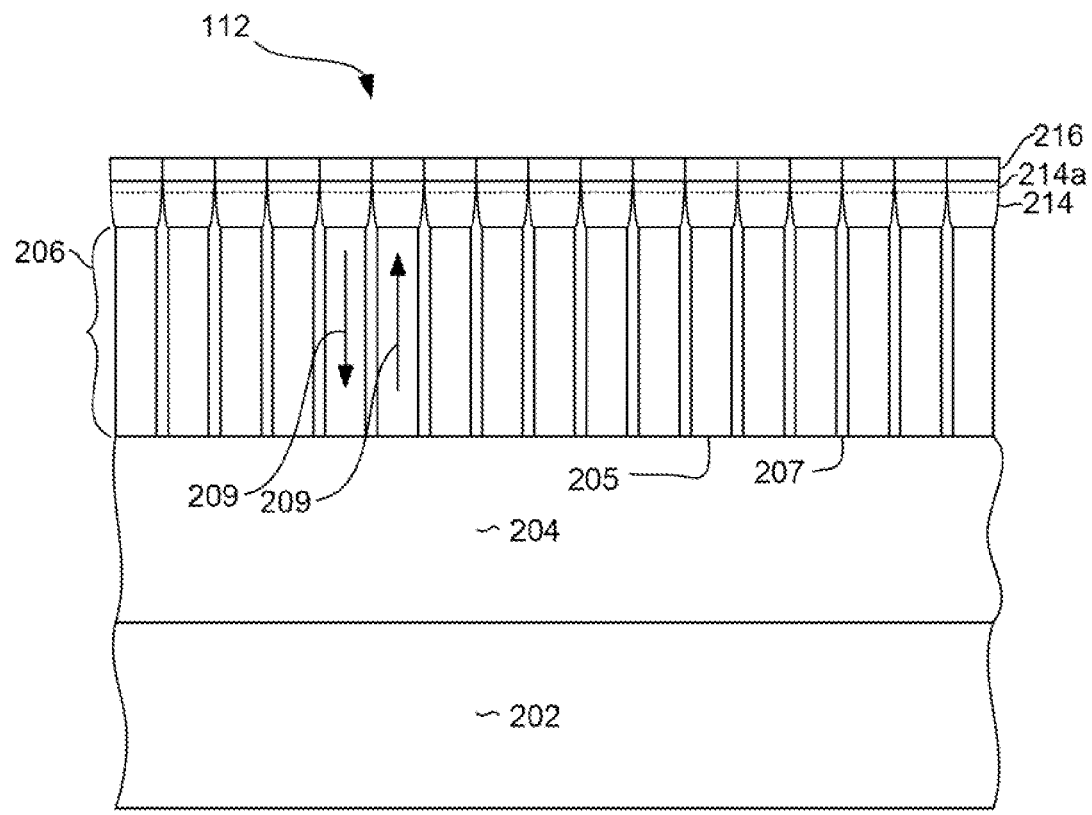
FIG. 2 is an enlarged, cross sectional view of a portion of a magnetic media according to an embodiment of the invention.

FIG. 2 is an enlarged, cross-sectional view of a portion of a magnetic disk according to an embodiment of the invention. The magnetic disk 112 includes a substrate 202, a soft magnetic under-layer 204 and a high magnetic anisotropy magnetic recording layer 206 formed over the soft magnetic layer 204. An optional cap layer 214 can be formed over the recording layer 206, and a hard protective coating such as carbon 216 can be formed to protect the under-lying layers from damage such as from physical contact or corrosion.

The magnetic recording layer structure 206 is formed as a plurality of grains 205 that are preferably separated from one another by non-magnetic oxide boundaries 207. When a magnetic bit is recorded to the media, the magnetization of the magnetic grain 205 is aligned in a direction either up or down as indicated by arrows 209 in FIG. 2.

The magnetic grains 205 of the recording layer 206 can be a material such as an ordered L10 Fe—P, chosen for its high magnetic anisotropy and moderately high Curie temperature Tc. The magnetic grains 205 can include other structures as well. For example in a thermally assisted recording system, the grains 205 of the recording layer 206 can include an exchange coupling layer within the grain (not shown) which helps to maintain thermal stability of the grain at normal operating temperature, but which allows the magnetization of the grains 205 to be switched at elevated temperatures during recording.

The cap layer 214 can be constructed of a highly exchange coupled magnetic alloy which may be an alloy containing Co, Cr and Pt. More particularly, the cap layer 214 can be a Co—Cr—Pt alloy having 50 to 80 atomic percent Co, 10 to 20 atomic percent Cr and 10 to 20 atomic percent Pt. The cap layer 214 may also include small amounts of one or more of B, Ta, Ru, W and Ti.

Figure 4A:
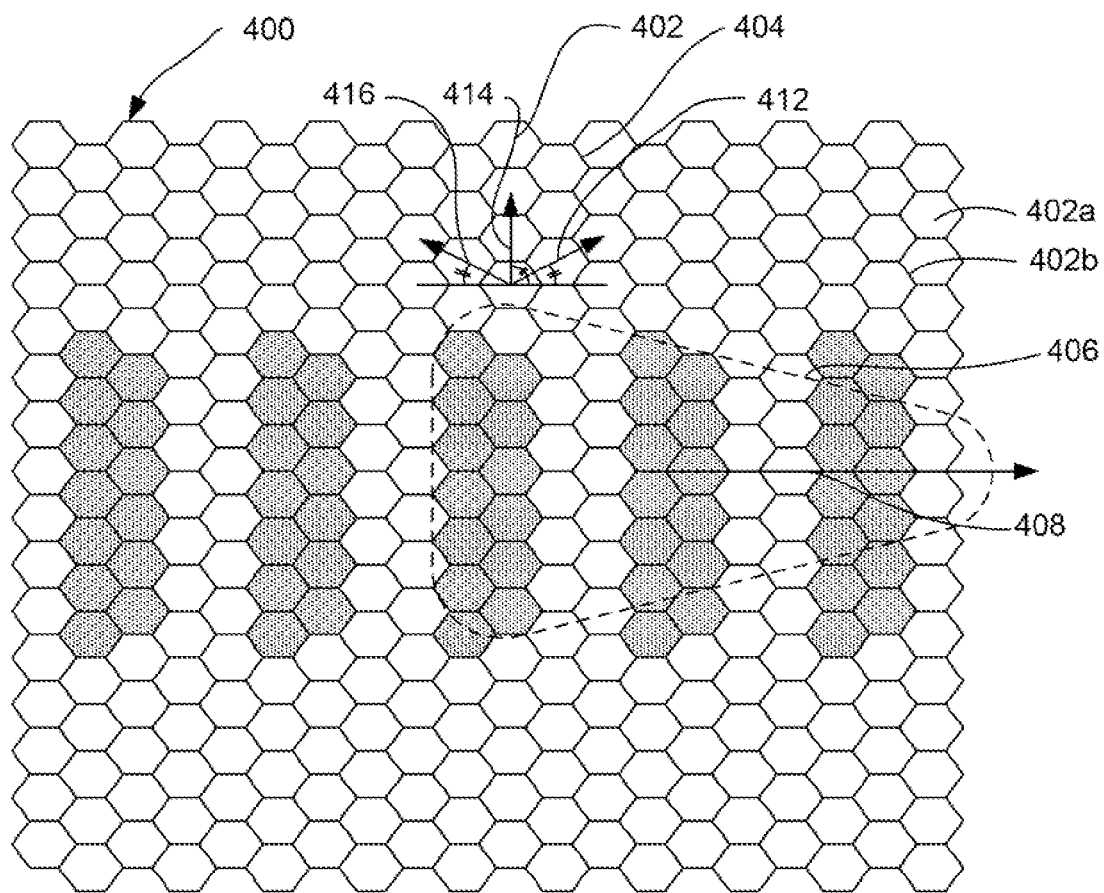
FIG. 4a is an enlarged top down view of a portion of a magnetic media having ordered grains with write synchronization with a head traveling without skew.
Figure 4B:
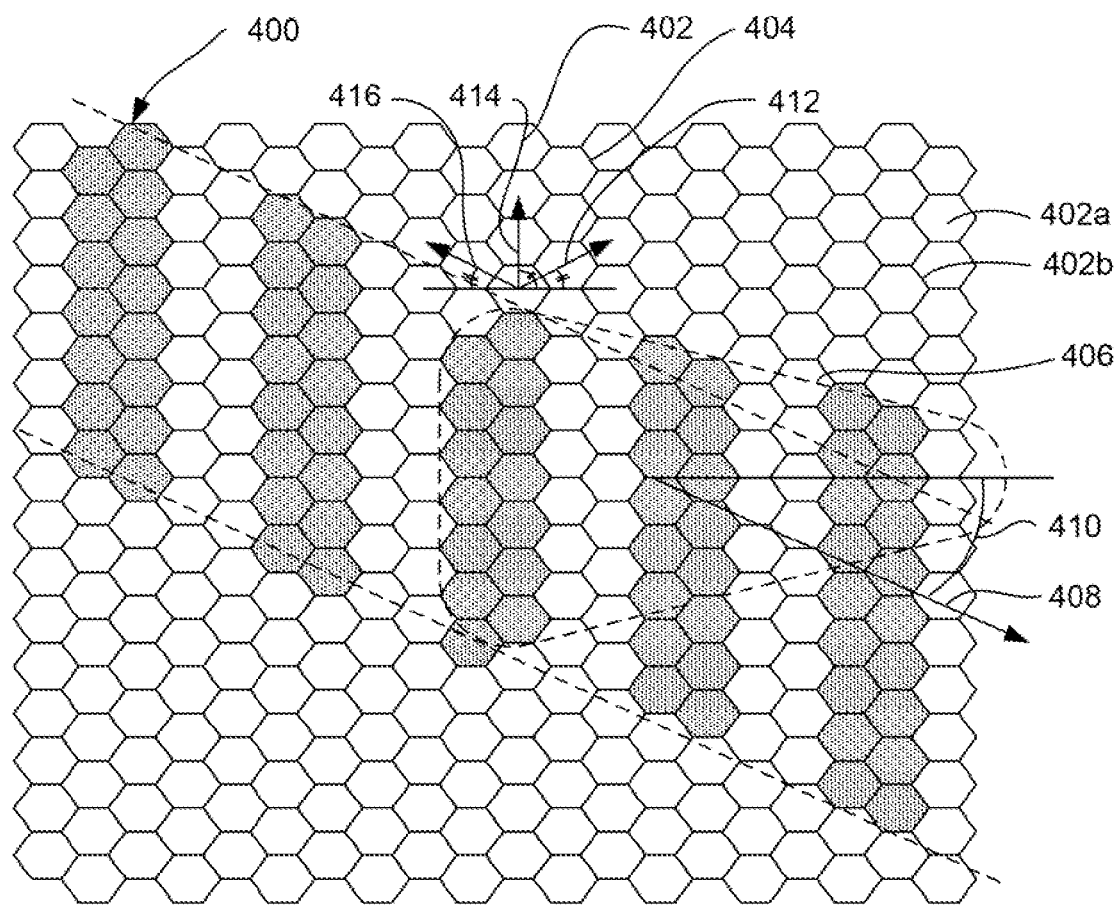
FIG. 4b is an enlarged top down view of a portion of a magnetic media having ordered grains with write synchronization with a head traveling with skew
Figure 5:
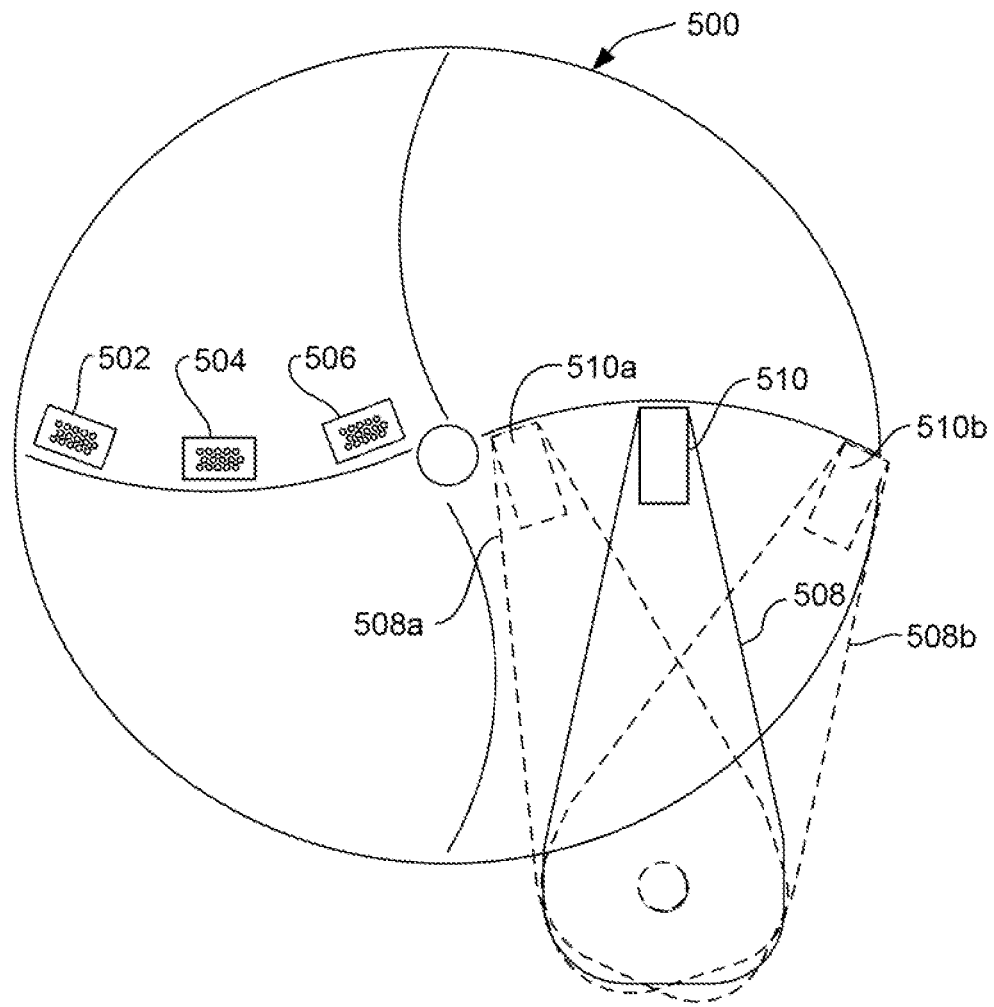
FIG. 5 is a top down view of a magnetic media showing an orientation of magnetic grain structure as affected by skew angle of a magnetic recording head over the surface of the media.

FIGS. 4a, 4b and 5 are enlarged top down views of a magnetic media 400 with a highly ordered, uniform size grain structure. FIG. 4a shows a head traveling without skew over a magnetic media, and FIG. 4b shows the head traveling at a skewed angle 410. Arrow 410 shows the direction of travel of the head over the media. With reference to FIGS. 4a and 4b, the media 400 includes magnetic grains 402 having a hexagonal shape and separated by thin non-magnetic oxide boundary layers 404. As discussed above, the magnetic grains 402 can be constructed of a Co alloy such as CoPtCr, and the hexagonal shape of the grains 402 is a result of the highly ordered HCP crystalline structure of the grains. It should be understood that FIGS. 4a, 4b and 5 schematically depict media with highly ordered grains, and that cases with less ordered nucleation and less regular grain arrangements and less regular grain shapes are included within the scope of the invention as well.

The well ordered, uniform shape of the grains 802 can be achieved through a templated media growth, by growing the grains on a substrate of pre-patterned nucleation sites. An example of such a process for producing well ordered, uniform grains 802 is described in United States Patent Application US 2011/013169, filed Dec. 16, 2009 and published Jun. 16, 2011, which is incorporated herein by reference.

Figure 3:
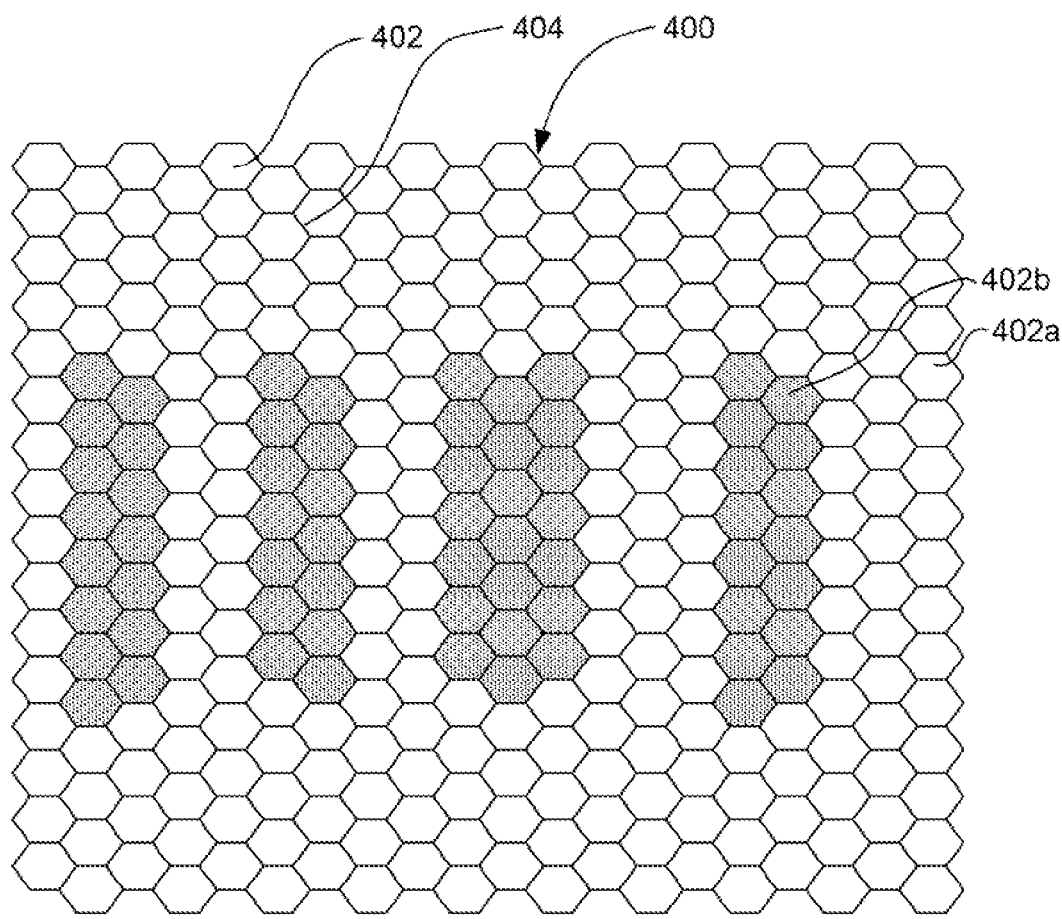
FIG. 3 is an enlarged top down view of a portion of a magnetic media having ordered grains and without write synchronization.

A challenge that arises as a result of having a very well ordered grain structure can be understood with reference to FIG. 3. While a highly ordered grain structure can provide a highly uniform size distribution and improved magnetic properties (e.g. a tighter switching-field distribution), a high degree of granular ordering may also have the adverse affect that the write process needs to be synchronized with the grain lattice. Otherwise higher transition jitter of the correlated lattice can offset gains made from improved grain properties. The prior art discusses the making of templated bit-patterned media in which large grains adopt the role of bit patterned islands and thus require all of the write synchronization techniques of regular bit patterned media. However, the conventional synchronization methods disclosed in prior art bit patterned media are too restrictive for use with templated continuous media such as that illustrated in FIGS. 3 and 4, which generally employ smaller grains size. No synchronization methods have been proposed for use with highly ordered continuous granular media. What is needed are methods to align and synchronize the write process to the templated grains of the media, as well as novel templating layouts for the regular growth of grains, and other means to optimize the advantages available from the use of a highly ordered media.

FIG. 3 shows a schematic view of a highly ordered magnetic media wherein the writing is not synchronized with the grain structure. In FIG. 3, the shaded cells 402b indicate magnetic grains that have been recorded to such that they are magnetized in a direction perpendicular to the media and anti-parallel to the direction of non-shaded cells 402a. In a highly ordered grain structure as shown in FIG. 3, the correlated positions of the grains lead to large fluctuations in the transition locations when the writing is not synchronized with the underlying lattice. Hence, write synchronization is required in order to take full advantage of highly ordered media capabilities.

With reference to FIG. 4, synchronization of magnetic writing can make the write signal frequency and pitch compatible with the size of the magnetic grain cells 402, allowing the pitch and frequency to be controlled and uniform. The ideal spatial write frequency for recording information onto the template media 400 is commensurate with the spatial frequency $F=1/(2nD)$, where $n=1, 2, \ldots$, depending on density and bit length. D is the down-track spacing of equivalent columns of grains, and F is the write frequency. Accordingly, the bit-cell size BX in the down track direction is $BX=nD$, where $n=1, 2, \ldots$, where $n=1$ corresponds to the highest data frequency that can be written on the templated medium. An equivalent constraint need not be placed on the track-pitch BY. However, BY must be larger than the grain size in the cross-track direction. The media 400 may be operating at a bit-aspect ratio that is relatively higher than would be the case using a bit patterned media. For example, the media 400 may have a bit aspect ratio in the range of three to five (the bit-aspect ratio does not need to be an integer). Cross track synchronization need not be used, because the size of the individual grains is small compared with the track width of the recorded bits. In FIG. 4, the arrow 414 indicates the major lattice direction, and arrows 412, 416 indicate the minor lattice directions.

The present invention includes methods for synchronizing the magnetic recording on highly ordered template granular media. In this way a recording system is created that utilizes a granular medium with improved effective media noise. Furthermore, the present invention enables larger grains relative to conventional continuous media.

As those skilled in the art will appreciate a magnetic bit is recorded using a write head having a write pole, which generally has a trapezoidal shape, with the bit size being primarily determined by the trailing edge of the write pole. An example of a magnetic footprint resulting from such a magnetic write pole is shown as dashed line 406 in FIG. 4. The skew of the magnetic head can vary along the radial directions of the disk. This is indicated by the orientation of the footprint 406 and by arrow 408 that indicates the direction of travel over the media 400. The difference between the orientation of the write head (or footprint 406) and the direction of travel 408 indicates the skew angle 410. The skew angle 410 varies along the radial direction of the disk. In order to maintain alignment with the trailing edge of the head, the lattice needs to be rotated appropriately to follow the head skew.

FIG. 5 also shows an actuator 508 having a slider 510 mounted thereon. As can be seen, when the actuator and slider are at an innermost position 508a, 510a or at an outermost portion 508b, 510b the skew is at a maximum and follows the lines 512 across the disk 500. FIG. 5 shows a magnetic disk 500 having different sectors 502, 504, 506, and shows how the direction of the primary lattice vector changes with location on the disk. There are several possible ways to compensate for skew. For example, the grain growth can be templated to position the lattice to account for this skew. Whatever method is used to compensate for skew, the trailing edge of the head should line up with the columns of equivalent grains. Accordingly, the grain templating direction rotates with radius to accommodate for skew.

Figure 6:
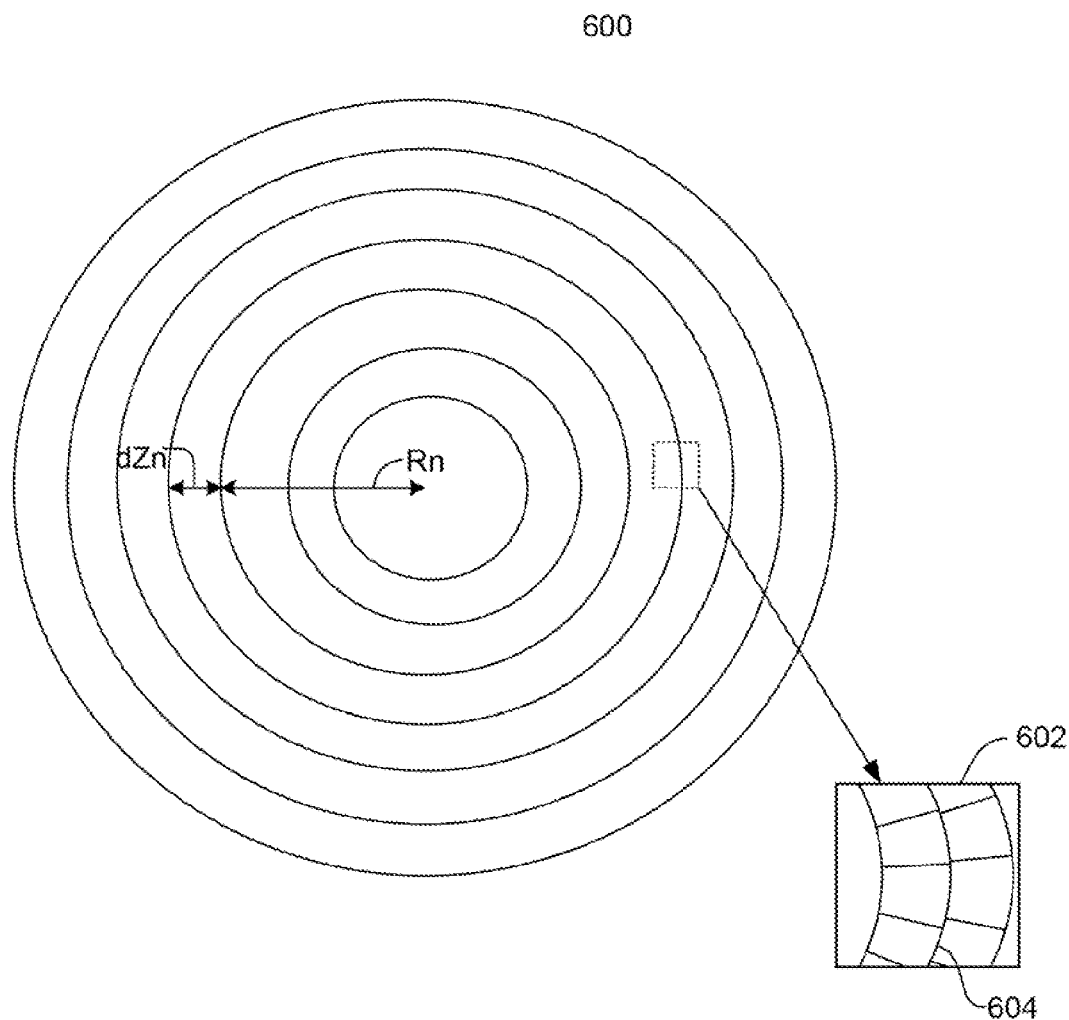
FIG. 6 is a top down view of a magnetic media showing an arrangement of zones according to an embodiment of the invention.
Figure 7:
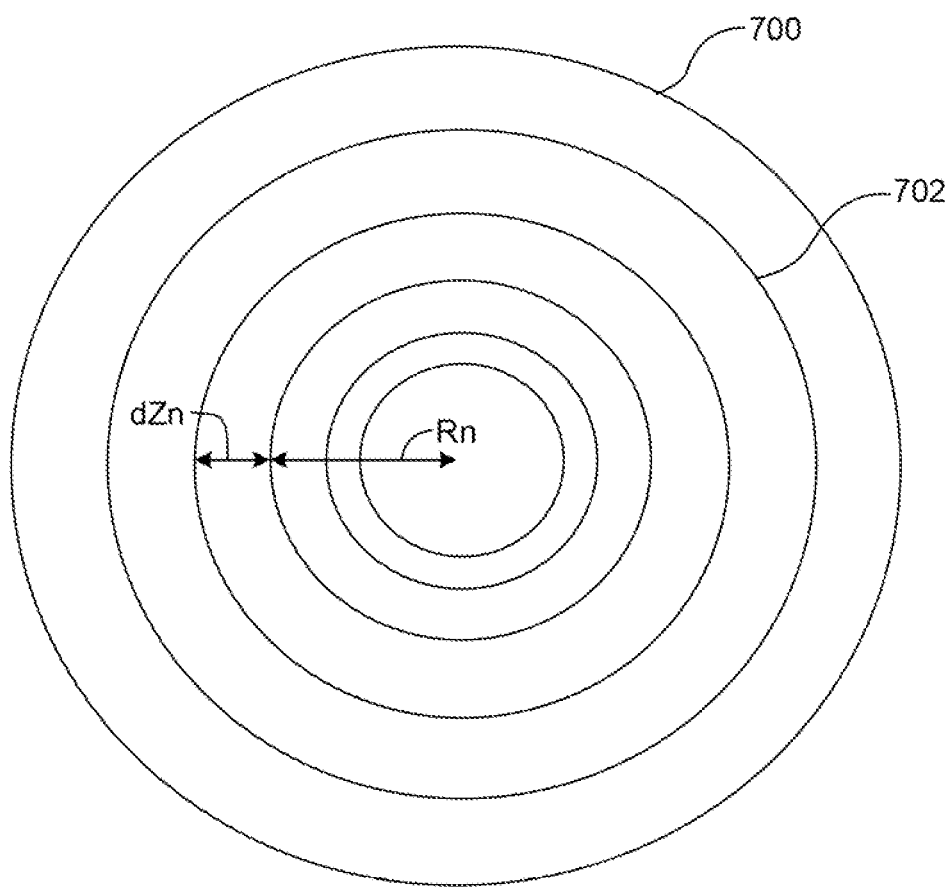
FIG. 7 is a top down view of a magnetic media showing an arrangement of zones according to an alternate embodiment of the invention.

Since the data tracks on the disk are circular, the templated lattice can be partitioned into zones to keep the down-track lattice pitch close to the optimal pitch of the templating process. FIGS. 6 and 7 illustrate how the templated media can be divided into such zones. For example in FIG. 6 each of the concentric circles on the disk 600 indicates a boundary between adjacent zones. The grains (as described above with reference to FIG. 4 are formed such that the primary lattice constant is arranged along a circumferential direction throughout the zone. However, because of this arrangement it can be understood that the lattice will be compressed at the inner most portion of each zone and stretched apart at the outermost portion of each zone in order to maintain a constant write frequency within each zone. At the boundary 604 between the zones, the grain lattice goes from being stretched at the inner zone to being compressed in the outer zone. This means that there will necessarily be a mismatch in the grain structures at the location between the zones. This is represented schematically with reference to the expanded inset 602 of FIG. 6.

FIG. 6 shows an embodiment having linearly increasing zone boundary locations, whereas FIG. 7 shows a media disk 700 having geometrically increasing (e.g. non-constant) zone boundary locations 702. In FIG. 6, Rn denotes the location of the innermost boundary of a zone, whereas dZn denotes the radial extent of the zone. The advantage of the embodiment of FIG. 6 is its simplicity. The maximum value of dZ is limited by how much the lattice can be compressed or stretched, which limits the size of all of the zones to the maximum size of the innermost zone. The embodiment of FIG. 7, while being more complicated, provides a zone distribution that reduces the number of zones in the disk. The amount of lattice compression or stretching is greater at the innermost zones, so these zones are smaller, whereas the zone sizes can increase with increasing radial distance of the zones. The geometric progression of the embodiment of FIG. 7 results in each zone having the same amount of lattice compression and expansion. This allowable amount of compression and stretching per unit length is determined in part by manufacturing processes for the templating.

Write Synchronization:

The write synchronization process requires learning how the underlying grain lattice varies with radius and angle around the disk. Key parameters for the recording system include the ideal write frequency F and the ideal write phase P for all points on the disk for nominal disk spindle frequency v0.

Figure 8:
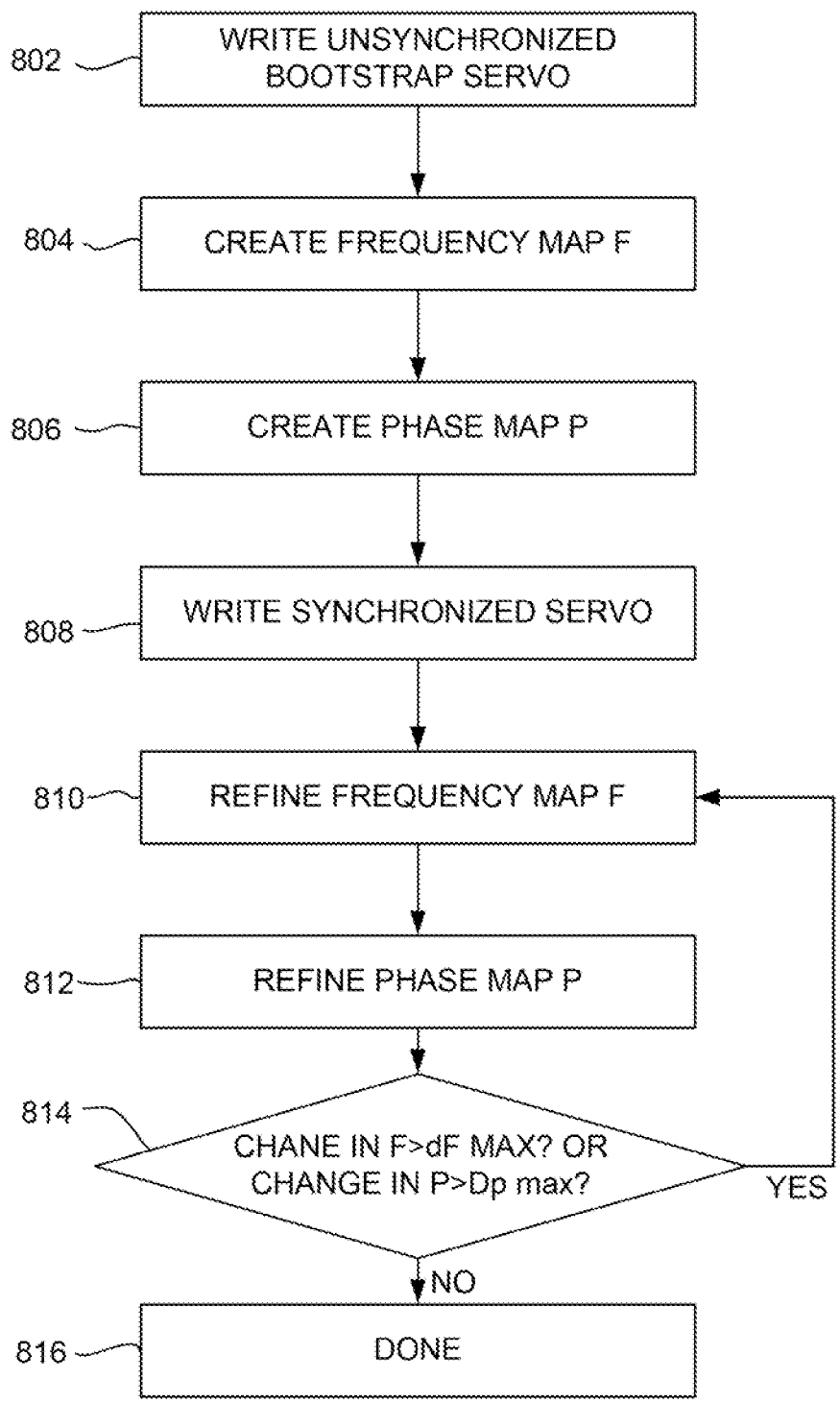
FIG. 8 is a flow chart illustrating a method according to an embodiment of the invention.

A process according to a first embodiment of the invention is illustrated with reference to FIG. 8. The magnetic disk drive system 100 as discussed above with reference to FIG. 1 can include circuitry and logic, such as within the data recording channel 125 for implementing the processes discussed below. First, in a step 802 a rough, unsynchronized, bootstrap servo pattern is written to the media. This bootstrap servo pattern is written without regard to synchronization with the underlying lattice of the grains, but at a relatively low density. For instance, the servo bit-cells may span 20 grains in the down-track direction. The large bit-cell size limits the fluctuation in bit-cell size resulting from grain lattice to about 10%, depending on the randomly selected phase of the servo writing relative to the granular array. A rough servo may be written at multiple radial locations on the disk, and is used for coarse referencing during subsequent application of the learning algorithm for ideal write frequency F and ideal write phase P, which will be discussed further below. The written in repeatable run-out and servo wedge-to-wedge timing differences should be determined, so that the rough, non-synchronized, bootstrap servo can provide the absolute radial position and relative angular location of the head over the disk.

After the initial bootstrap servo has been recorded, a frequency map can be created in a step 804 and a phase map can be created in a step 806. Application of the frequency F and phase P learning algorithm at selected radial locations is used to create an initial map $F(r,\theta)$ of frequencies and map of phases $P(r,\theta)$, where r and $\theta$ denote the radius and azimuthal angle relative to a servo mark on the course bootstrap servo pattern.

During the operation of the disk drive 100 (FIG. 1), r and $\theta$ will need to be corrected for read-write offset and separation, as well as variations in disk rotation speed. Before writing, the read head reads the servo marks that provide r_r and $\theta$_r for the read head position, as well as the actual spindle frequency v. The values of _r and $\theta$_r, and v can be derived from cylinder number, position error signal, and sync marks in the servo wedges that are read prior to writing. F_w and P_w used during the write process can be determined from the table of $F(r,\theta)$ and $P(r,\theta)$ values via:

$$F\_w=(v/v0)*F(r\_r+RW\_\text{off}(r\_r),\theta\_r+2*pi*v*(t+t0)+RW\_\text{separation}(r\_r),$$

and $$P\_w=P(r\_r+RW\_\text{off}(r\_r),\theta\_r+2*pi*v*(t+t0)+RW\_\text{separation}(r\_r).$$

The symbol t in the above equations is the time after the write process has started and t0 represents any latencies between the time when $\theta$_r was determined and the time when the write process started.

Next, in a step 808 a synchronized servo is written. The information of F and P found above in steps 802-806 is used to improve the servo by rewriting the servo in a synchronized fashion. This may be done, for instance, by using the coarse servo on track (n−1) to write a high quality synchronized servo at track n, and so forth. In step 810 a refined frequency map is generated and in step 812 a refined phase map is generated. Then, in a decision step 814 a determination is made as to whether the change in frequency F is greater than an allowable change dF or whether a the change in phase P is greater than an allowable change in phase dF. If the answer to either of these questions is yes, then the process returns to reiterate steps 810 and 812. If the answer to either of these questions is no, then the process can terminate 816. Once $F(r,\theta)$ and $P(r,\theta)$ have been determined for several locations, knowledge of the original template layout can be used to extrapolate F and P to all radii and angles. This also determines the run-out between the templated pattern and the disk rotation axes, which will be discussed further herein below. The above, therefore, describes an iterative process for determining an optimal frequency F and optimal phase P that is synchronized with the grain lattice of a highly ordered templated media.

Figure 9:
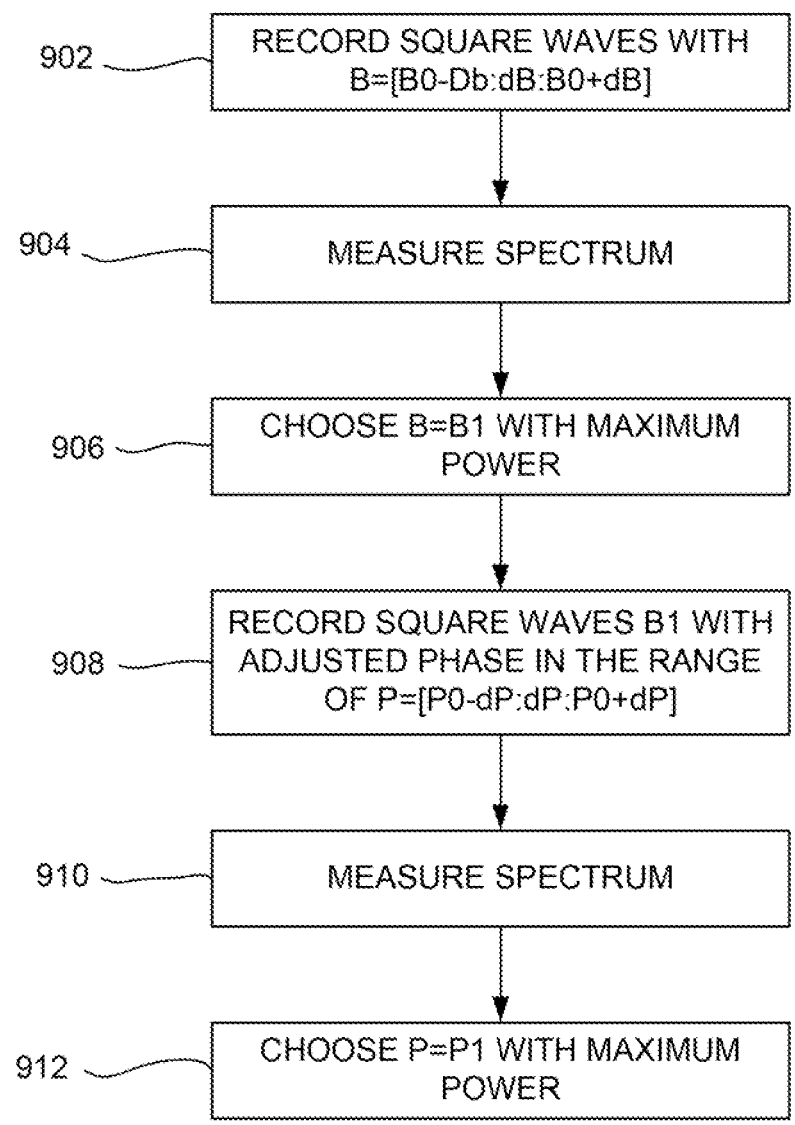
FIG. 9 is a flow chart illustrating a method according to an alternate embodiment of the invention.

Several embodiments are available for an algorithm for learning frequency F and phase P at a particular disk location r and $\theta$. One such embodiment is illustrated with reference to FIG. 9. First, in a step 902 several test patterns are recorded at a write frequency B. These test patterns are recorded with B=[B0−Db:dB:B0+dB] and are read back. The test patterns can be 1T tones, which are square waves with a frequency f=1/(2D). The nominal bit length serves to provide the center frequency 1/(2B0) for iterative refinement of the measurements. Then, in a step 904, the frequency spectrum is measured. The read-back waveforms are compared in terms of spectral content and the frequency B1 that gave the largest spectral amplitude is assigned to $F(r,\theta)$. In a step 908, a several test patterns are written a different write phases P, but with the frequency B1. In a step 910 the spectrum is again measured. In a step 912, the phase that gave the largest spectral signal is assigned to $P(r,\theta)$. The phase that provides the largest signal amplitude or maximum power is chosen at P=P1.

The written patterns could also be a Pseudo-Random Bit Sequence (PRBS) sequences. In that case the phase that has the lowest bit error rate (BER) would be picked as P=P1. The algorithm may be applied during servo writing. The algorithm may also be applied during other operations of the drive, for instance, in cases of data recovery from drives with corrupted servo regions. In this case, the servo capability may be rebuilt from the underlying template lattice by applying the algorithm. Hence, the present application can be useful for enhancing the robustness of high-value data, such as data from flight recorders.

Figure 10:
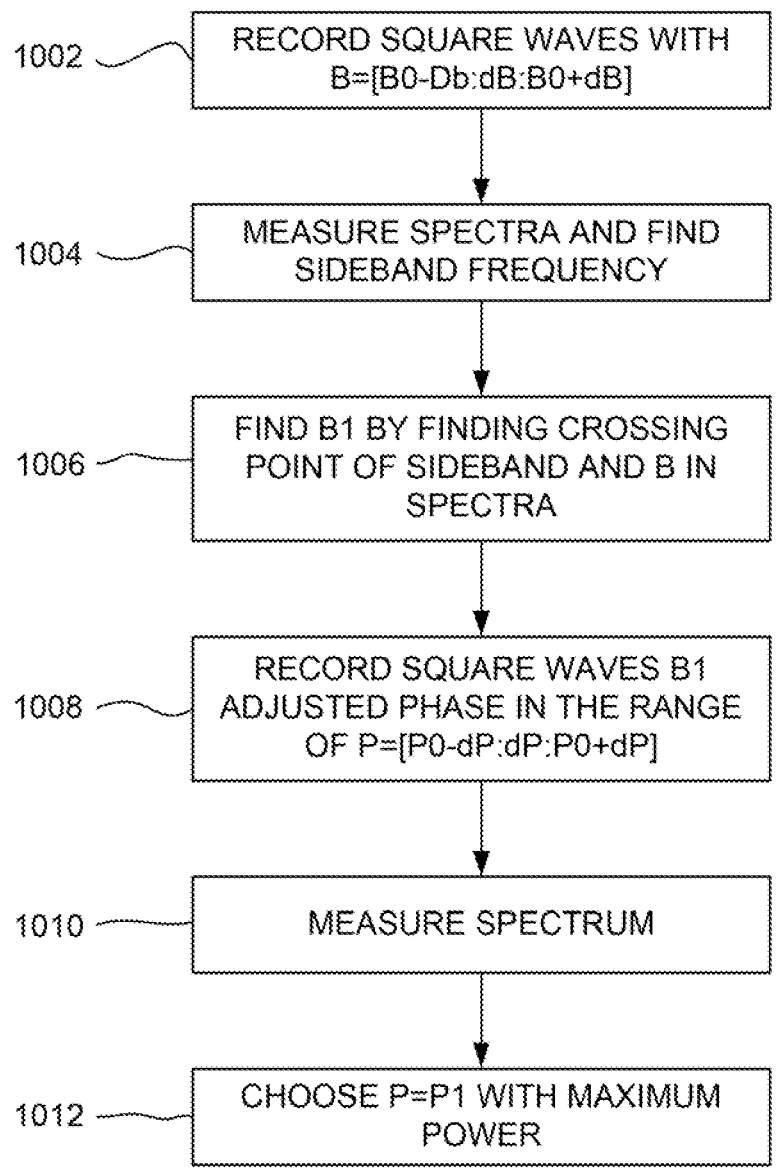
FIG. 10 is a flow chart illustrating a method according to yet another embodiment of the invention.

FIG. 10 illustrates another embodiment in which sideband tones are used to determine F. When writing tones on a quantized lattice, a sideband frequency will appear in the spectrum located at the write frequency reflected around the lattice frequency. This side band peak coincides with the write frequency peak when writing at the lattice frequency.

In a step 1002, a pattern is recorded with B in the range of [B0−Db:dB:B0+dB]. This pattern can be recorded as square waves. Then, in a step 1004, a spectra is measured and a sideband frequency is found. Then, in a step 1006 B1 is determined by finding a crossing point of sideband and B in the spectra. In a step 1008 a pattern is recorded using the B1 adjusted phase in the range of P=P0−dP:dP:P0+dP]. Again the pattern can be recorded as square waves. Then in FIG. 1010 the spectrum is measured. In step 1012 P=P1 is chosen for the phase that provides maximum power.

Figure 11:
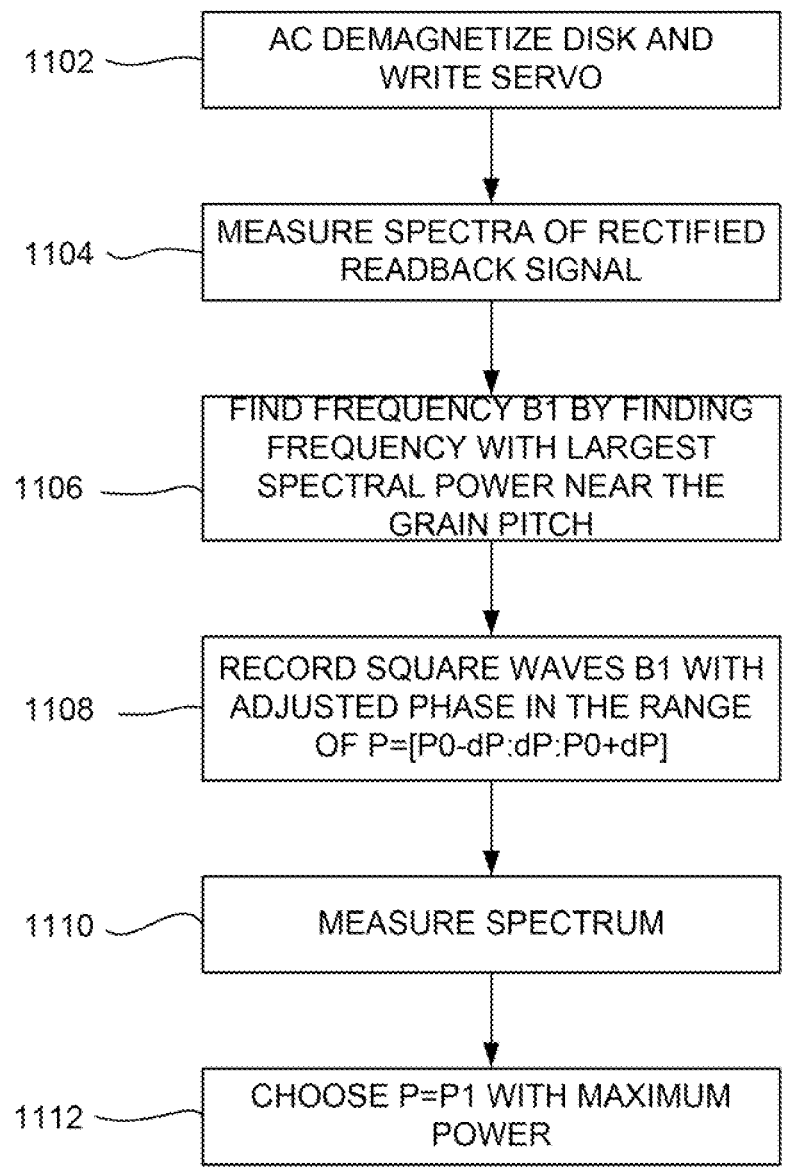
FIG. 11 is a flow chart illustrating a method according to still another embodiment of the invention.

FIG. 11 illustrates another embodiment of the invention. In a step 1102, the disk is AC demagnetized and a servo pattern is recorded. The AC demagnetization is performed prior to the servo writing, such as before disk drive assembly, or by writing 1T patterns close to the grain pitch frequency in the regions under evaluation. Thereafter, in a step 1104 the servo write data is read back from the different regions and analyzed by first rectifying the signal before examining the spectral content. The data should be sampled at a sampling frequency of at least two samples per grain. Then in a step 1106, the data is analyzed to find the frequency with the maximum power near the grain pitch. The optimal phase is determined in the same manner as previously discussed. In a step 1108 a pattern is recorded at frequency B1 with the phase adjusted in the range of P=[P0−dP:dP:P0+dP]. Then in a step 1110 the spectrum is measured, and in a step 1112 P=P1 is chosen as phase having the maximum power.

Figure 12:
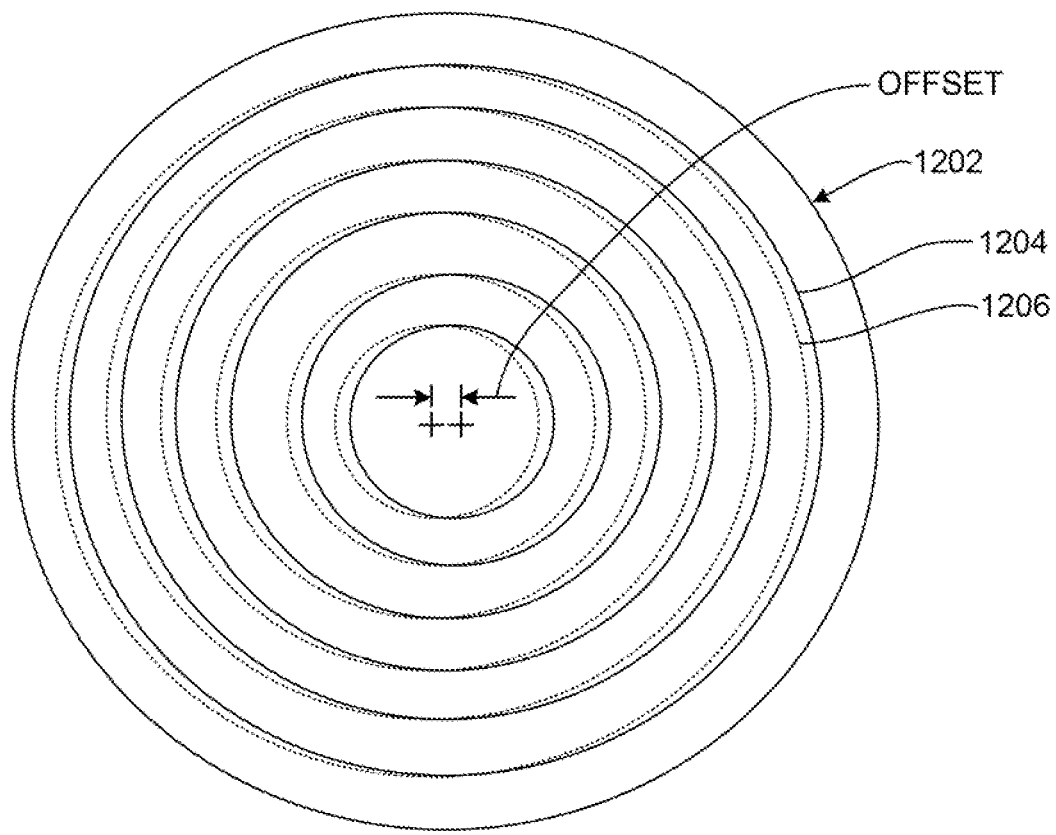
FIG. 12 is a schematic, top-down view of a magnetic media illustrating an offset between data tracks and zones.

FIG. 12 illustrates the consequences of run-out with regard to servo-synching. FIG. 12 shows a disk 1202 having ideal data tracks 1204 shown in solid line and zone boundaries 1206 shown in dotted line. As can be seen, because of an offset between the location of the ideal data tracks 1204 and the zone boundaries 1206, the ideal data tracks 1204 and zone boundaries 1206 cross one another. At the zone boundaries 1206 the grain lattice has a jump and any patterns written there will have more jitter and hence a higher bit error rate (BER). Crossing zone boundaries also requires a change in the write frequency. The present invention provides three solutions for zone boundary crossing problems. In one embodiment, the data tracks are aligned to be concentric with zone boundaries and hence follow the template run-out. In the second embodiment, the data tracks are aligned concentric with the disk rotation axis. Here, the zone crossings are handled by subdividing sectors that fall on the boundary into three sections. One of these sections is the zone boundary region and is treated as a bad disk region. Data is only written to the other two regions in the sector, but at different frequencies. In the last embodiment, the zone boundary region is written at a lower write frequency than that of the other two regions. The frequency is chosen to be low enough so that the extra jitter does not unduly affect the bit error rate (BER). All three embodiments may also be equipped with read run-out (RRO) dependent error correction control (ECC) or RRO-dependent track-EEC. The amount of ECC or track-ECC may be selected depending on the RRO determined from the frequency and phase tables (F/P tables) and may vary from drive to drive. An example of a method for error correction control can be found with reference to U.S. Pat. No. 8,316,284, entitled "Collecting Failure Information On Error Correction Code (ECC) Protected Data". Furthermore, varying amounts of ECC or track-ECC may be assigned locally to different regions of each surface, depending on whether tracks go through zone crossings.

The present invention also provides a means for determining $F(r,\theta)$ and $P(r,\theta)$, as well as the run-out, for the whole disk using a finite number of measurements at different r and $\theta$ values. The number of servo wedges that are written is chosen based on the knowledge of the maximum expected run-out that is typical for the drive manufacturing. The number of servo wedges is picked appropriately with a minimum of two servo wedges within each zone. For example, current server drives may have 300-500 servo sectors, which generally would provide sufficient resolution for implementing the invention. In the absence of run-out, the lattice frequency F would be constant between consecutive servo wedges at the same radius. However, run-out causes F to vary periodically with $\theta$, but with jumps in F and P, when a zone boundary is crossed. For determining run-out, it is sufficient to evaluate the behavior of F. An example of how the F information looks when zone boundaries are crossed is given in the FIG. 13. This plot of $F(\theta)$ will also serve to describe an embodiment of the algorithms and methods for determining the effective run-out of the template.

Figure 13:
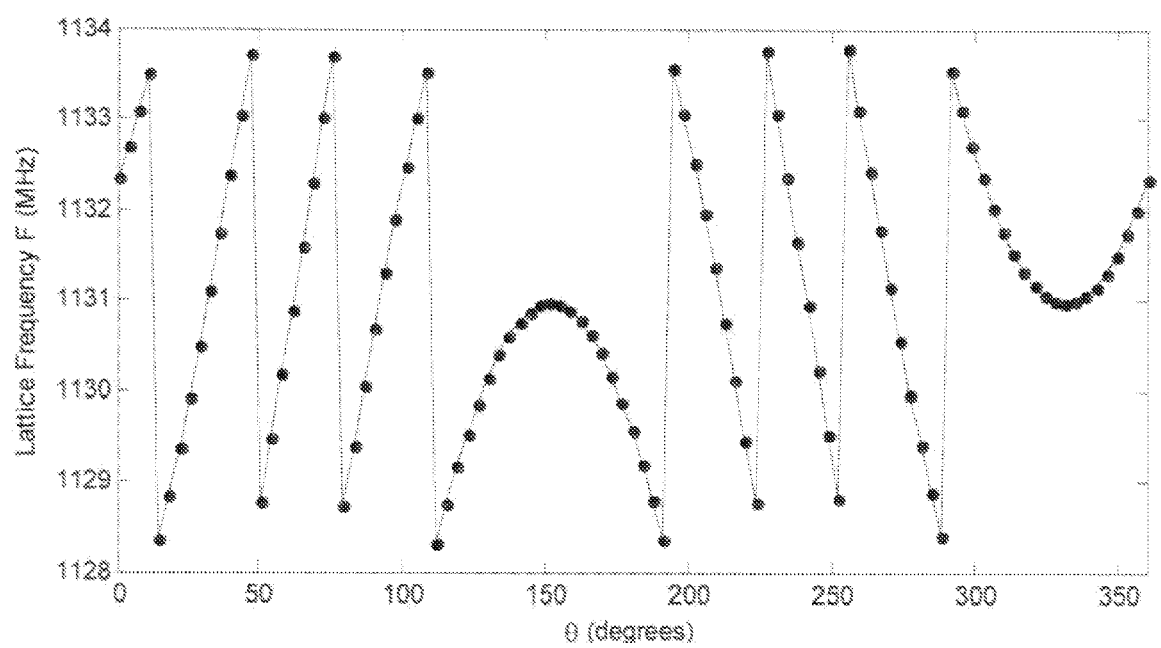
FIG. 13 is a graph of lattice frequency vs. rotational angle.

FIG. 13 shows lattice frequency F vs. disk rotation angle at 20 mm radius for a 5400 rpm disk with 10 nm natural lattice pitch. The zone boundary width is kept constant from zone to zone at 100 nm in the radial direction. The run-out is 200 um. The lattice is sampled 100 times around the disk. The difference of frequencies in adjacent zones are about 0.5%.

An algorithm and method are described herein for determining the effective run-out of the template. It is noted that the dependence of the lattice frequency on $\theta$ depends on many parameters, including:

L0=natural spatial period of the lattice
L=lattice period as seen by the moving head
$\alpha$=expansion fraction
$\phi$=lattice skew at template radius R
n=zone index
$dZ_n$=separation between zones n and n−1 in the radial direction
R0=radius for first zone index, as measured from center of the template
R=radial location of the write head, as measured from center of template
r=radial location of the write head, as measured from the center of disk rotation
v0=disk rotational frequency
rro=distance between center of disk rotation axis and center of template axis
$\theta 0$=angle at which run-out is maximal.

Figure 14:
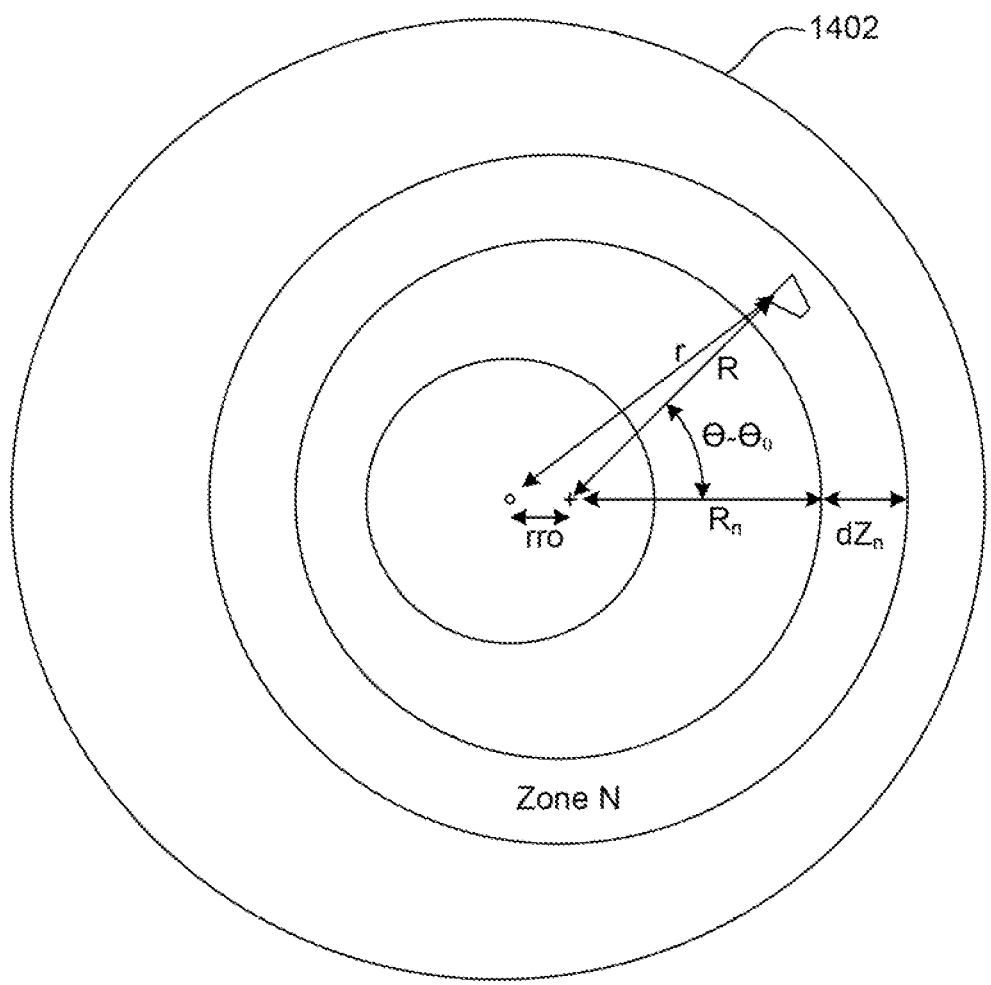
FIG. 14 is a schematic, top-down view of a magnetic media illustrating various parameters playing a part in determining an ideal frequency F and phase P.

These parameters are further illustrated with reference to FIG. 14, which shows the above parameters schematically on a disk 1402.

The parameter R can be found as:

$$R=(r^2+rro^2+2*r*rro*\cos(\theta-\theta 0))^{0.5}$$

The parameter L can be found as:

$$L=(L0/\cos(\phi(R))*(R(R_n+dZ_n/2))$$

The parameter $F(r,\theta)$ can be found as:

$$F(r,\theta)=2*\pi*v*r/L.$$

The above equations can be used in the following way to determine R, rro and $\theta 0$ by fitting the $F(r,\theta)$ measurement as exemplified by the disk schematic of FIG. 14. First, the frequency as seen in the reference frame of the head is sampled at a sufficient rate as discussed above. Secondly, the frequency samples are fitted in order to find the parameters r, rro θ0 and n0 using least-squares methods and knowledge of the values of Rn and dZn from template parameters. The parameter n0 represents the smallest zone index within the sample data set. The frequency samples may also be partitioned into multiple fitting subsections depending on the quality of the frequency data.

Since the layout of the template is known, the fits of F for a single r determine, in principle, the frequency F(r,θ) and zone boundary locations for the rest of the disk. The measurements can be further refined by re-measuring repeatedly at different radii until F and P have been determined with sufficient precision for the whole disk. The degree of accuracy depends on how write synchronization is implemented and in particular how frequently the optimal write phase is updated throughout the write process. As an example, we assume the write phase error can be at most 10% (1−sigma). If data is written in blocks of 4086 Bytes, then $((\delta F*32768)^0.5<0.1$. If the error is divided evenly, then the requirement is $\delta P<0.07$ and $\delta F<2e-6$. The procedure discussed above is iterated until the fit errors fall below these values. The fitting procedure can be modified to account for known RRO and distortions in the template. This amounts to adding correction terms to R, L, and n in the equations above as part of the fit.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for magnetic data recording, comprising:
   providing a magnetic media configured for perpendicular magnetic data recording and having an ordered granular structure;
   writing an un-synchronized bootstrap servo to the magnetic media;
   creating a frequency map;
   creating a phase map;
   writing a synchronized servo;
   refining the frequency map; and
   refining the phase map;
   wherein the steps of refining the frequency map and refining the phase map are repeated until a change in frequency and a change in phase are no greater than a predetermined allowable value.

2. The method as in claim 1, wherein the refining of the frequency map and refining of the phase map further comprise:
   recording a first series of test pattern a plurality of frequencies;
   measuring a frequency spectrum for series of test patterns, and selecting a frequency B1 that provides the largest amplitude;
   writing a second series of test patterns at a plurality of phases and at the selected frequency B1;
   measuring a spectrum of the second series of test patterns; and
   selecting a phase from the spectrum of the second series of test patterns that provides maximum power.

3. The method as in claim 2, wherein the first and second series of test patterns are recorded as square waves.

4. The method as in claim 1, wherein the refining of the frequency map and refining of the phase map further comprise:
   writing a first series of test patterns at a plurality of frequencies;
   measuring a first spectra and finding a side band frequency;
   finding a crossing point between side band and frequency to determine an optimal frequency;
   recording a series of test patterns at the optimal frequency and at a range of phases;
   measuring a second spectra; and
   choosing a phase with maximum power.

5. A method for magnetic data recording, comprising:
   providing a magnetic media configured for perpendicular magnetic data recording and having an ordered granular structure;
   de-magnetizing the disk and writing a servo pattern;
   measuring a first spectrum of a rectified read-back signal;
   finding an optimal frequency by choosing a frequency from the spectra that has largest power near the grain pitch;
   recording a test pattern at a range of phases;
   measuring a second spectrum; and
   choosing a phase from the spectrum that has maximum power.

6. The method as in claim 5, wherein the demagnetization is AC demagnetization.

7. The method as in claim 5, wherein the reading of the servo pattern further comprises sampling the servo pattern at a sampling frequency of at least two grains per sample.

8. A magnetic data recording system, comprising;
   a housing;
   a magnetic media mounted within the housing, the magnetic media being a templated, perpendicular magnetic media having a recording layer configured as an ordered array of grains;
   a slider having a read head and a write head formed thereon;
   an actuator connected with the slider for movement adjacent to a surface of the magnetic media; and
   electronics connected with the read and write head for reading data from the magnetic media and writing data to the magnetic media, the electronics being further operable to synchronize a write frequency and write phase with the ordered array of grains;
   wherein the circuitry is further functional to:
      write an un-synchronized bootstrap servo to the magnetic media;
      create a frequency map;
      create a phase map;
      write a synchronized servo;
      refine the frequency map; and
      refine the phase map;
   wherein the refining of the frequency map and refining of the phase map are repeated until a change infrequency and a change in phase are no greater than a predetermined allowable value.

9. The magnetic data storage system as in claim 8, wherein the refining of the frequency map and refining of the phase map further comprise:
   recording a first series of test pattern a plurality of frequencies;
   measuring a frequency spectrum for series of test patterns, and selecting a frequency B1 that provides the largest amplitude;
   writing a second series of test patterns at a plurality of phases and at the selected frequency B1;
   measuring a spectrum of the second series of test patterns; and
   selecting a phase from the spectrum of the second series of test patterns that provides maximum power.

10. The magnetic data recording system as in claim 9, wherein the first and second series of test patterns are recorded as square waves.

11. The magnetic data recording system as in claim 8, wherein the refining of the frequency map and refining of the phase map further comprise:
- writing a first series of test patterns at a plurality of frequencies;
- measuring a first spectra and finding a side band frequency;
- finding a crossing point between side band and frequency to determine an optimal frequency;
- recording a series of test patterns at the optimal frequency and at a range of phases;
- measuring a second spectra; and
- choosing a phase with maximum power.

12. The magnetic data recording system as in claim 8, wherein the circuitry is further functional to:
- de-magnetize the disk and writing a servo pattern;
- measure a first spectrum of a rectified read-back signal;
- find an optimal frequency by choosing a frequency from the spectra that has largest power near the grain pitch;
- record a test pattern at a range of phases;
- measure a second spectrum; and
- choose a phase from the spectrum that has maximum power.

13. The magnetic data recording system as in claim 12, wherein the demagnetization is AC demagnetization.

14. The magnetic data recording system as in claim 13, wherein the reading of the servo pattern further comprises sampling the servo pattern at a sampling frequency of at least two grains per sample.

15. A magnetic data recording system as in claim 8 wherein the magnetic media has a lattice with one or more lattice vectors and wherein the grain lattice is ordered so that one of the one or more lattice vectors is kept parallel to a constant field contour of a trailing edge of a write pole of the write head and is appropriately rotated to account for skew of the write head.

16. A magnetic data recording system as in claim 8 wherein the system is configured for one or more of thermally assisted magnetic recording, microwave assisted recording and shingled magnetic recording.

17. A magnetic data recording system as in claim 8 wherein the electronics is configured to synchronize the write frequency and write phase in a down-track direction, but not in a cross-track direction.

* * * * *